(12) United States Patent
Han et al.

(10) Patent No.: US 7,230,722 B2
(45) Date of Patent: Jun. 12, 2007

(54) SHADOW MOIRE USING NON-ZERO TALBOT DISTANCE

(75) Inventors: Bongtae Han, Rockville, MD (US); Changwoon Han, Seoul (KR)

(73) Assignee: University of Maryland, College Park, MD (US)

( * ) Notice: Subject to any disclaimer, the term of this patent is extended or adjusted under 35 U.S.C. 154(b) by 0 days.

(21) Appl. No.: 11/252,789

(22) Filed: Oct. 19, 2005

(65) Prior Publication Data

US 2007/0086020 A1    Apr. 19, 2007

(51) Int. Cl.
*G01B 11/24*    (2006.01)
(52) U.S. Cl. ............... 356/605; 356/618; 250/237 G
(58) Field of Classification Search ....... 356/601–625; 250/237 G, 341.1, 201.1; 315/150–159, 315/208
See application file for complete search history.

(56) References Cited

U.S. PATENT DOCUMENTS

| | | | |
|---|---|---|---|
| 3,858,981 A * | 1/1975 | Jaerisch et al. | 356/512 |
| 4,800,547 A * | 1/1989 | Kessels et al. | 369/44.24 |
| 4,972,075 A * | 11/1990 | Hamada et al. | 250/201.5 |
| 5,311,286 A * | 5/1994 | Pike | 356/605 |
| 5,601,364 A | 2/1997 | Ume | |
| 5,636,025 A * | 6/1997 | Bieman et al. | 356/619 |
| 5,898,486 A * | 4/1999 | Chesko et al. | 356/35.5 |
| 6,603,103 B1 * | 8/2003 | Ulrich et al. | 250/205 |
| 6,731,391 B1 * | 5/2004 | Kao et al. | 356/605 |
| 6,841,780 B2 * | 1/2005 | Cofer et al. | 250/341.1 |
| 2004/0189938 A1 * | 9/2004 | Eagan | 351/208 |

OTHER PUBLICATIONS

Yeh et al., "Experimental and Analytical Investigation of Thermally Induced Warpage for Printed Wiring Boards", 1991 IEEE, pp. 382-387.
Martin et al., "Measurement of Thermally Induced Warpage in Printed Wiring Boards", AMD-Vo. 13/EEP-vol. 1, (Manufacturing processes and Materials Challenges in Microelectronic Packaging (ASME 1991), pp. 43-47.

* cited by examiner

*Primary Examiner*—Sang H. Nguyen
(74) *Attorney, Agent, or Firm*—Squire, Sanders & Dempsey L.L.P.

(57) ABSTRACT

A method for measuring deformation in specimens is provided. The method includes providing a shadow moiré system, the shadow moiré system including an illumination source, a reference grating and an image capture device and providing a specimen. The method further includes determining a selected distance between the specimen and the reference grating, and illuminating the specimen with light from the illumination source directed through the reference grating onto the specimen, thereby forming shadow moiré fringes onto the specimen. The method further includes capturing an image of the shadow moiré fringes by the image capture device.

21 Claims, 6 Drawing Sheets

SHADOW MOIRE USING NON-ZERO TALBOT DISTANCE

BACKGROUND OF THE INVENTION

1. Field of the Invention

The invention relates to a method and apparatus for measuring out-of-plane displacement or deformation in the field of solid mechanics.

2. Description of the Related Art

There are several techniques for measuring out-of plane displacements (W) that are generally utilized. The techniques determine the topology of a specimen surface i.e., its deviation from a plane surface. In mechanics, the techniques are used to measure the topography of initially flat surfaces to evaluate warpage caused by load, temperature, humidity, age or other variables.

Shadow moiré is a method which is widely used for out-of-plane displacement measurements in the field of solid mechanics.

SUMMARY OF THE INVENTION

According to an exemplary embodiment of the invention, a method for measuring deformation in specimens is provided. The method includes providing a shadow moiré system, the shadow moiré system including an illumination source, a reference grating and an image capture device and providing a specimen. The method further includes determining a selected distance between the specimen and the reference grating, and illuminating the specimen with light from the illumination source directed through the reference grating onto the specimen, thereby forming shadow moiré fringes onto the specimen. The method further includes capturing an image of the shadow moiré fringes by the image capture device.

According to another embodiment of the invention a system for measuring deformation in specimens is provided. The system includes means for supporting a specimen in an observation position, and a grating of pitch g supported in a stationary position. The system further includes a light source for illuminating the specimen through the grating such that shadow moiré fringes are formed on the specimen. The system further includes an image capturing device for capturing images of the shadow moiré fringes, wherein the grating is placed at a selected distance from the specimen.

According to another embodiment of the invention, an apparatus for measuring deformation in specimens is provided. The apparatus includes a support means for supporting a specimen in an observation position and a grating of pitch g supported in a stationary position by a support means. The apparatus further includes an illumination means for illuminating the specimen through the grating such that shadow moiré fringes are formed on the specimen, and an image capturing means for capturing images of the shadow moiré fringes, wherein the grating is placed a selected distance from the specimen by the support means.

BRIEF DESCRIPTION OF THE DRAWINGS

For proper understanding of the invention, reference should be made to the accompanying drawings, wherein.

DETAILED DESCRIPTION OF THE PREFERRED EMBODIMENT(S)

Figure 1:
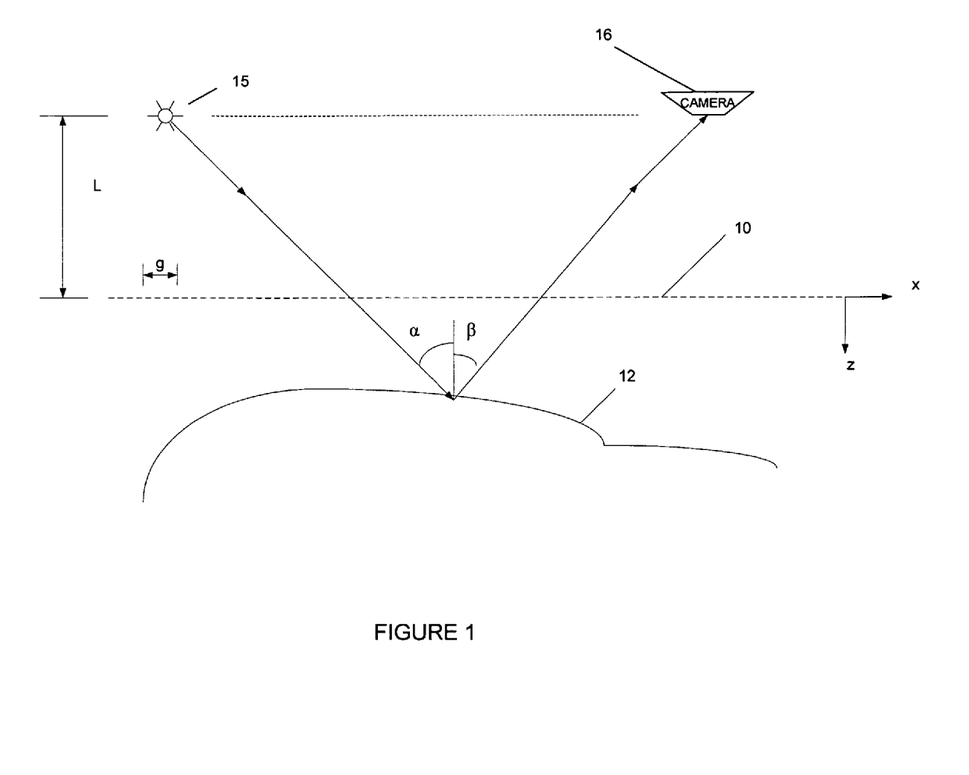
FIG. 1 is an example that illustrates the principal of shadow moiré.

FIG. 1 is an example that illustrates the principal of shadow moiré. As shown in FIG. 1, a linear reference grating 10 of a pitch g is positioned adjacent to the surface of a specimen 12. A light source 15 illuminates the grating 10 and the specimen 12 at angle $\alpha$, and a camera 16 receives light at angle $\beta$, which is scattered in different directions by the matte specimen surface. The shadow of the reference grating cast upon the specimen 12 interacts with the reference grating 10 to form the moiré pattern viewed by the camera 16. According to this method, the warpage of specimen, including, but not limited to, a printed wiring board (PWB) or printed wiring assembly (PWA), or a micro-electronic device, can be calculated as W=NP/(tan $\alpha$+tan $\beta$), where W is the out-of plane deformation of the PWB or PWA;

$\alpha$ is the incident angle of light;

$\beta$ is the camera viewing angle;

N is the fringe order; and

P is the pitch of the grating.

The shadow image interacts with the reference grating to form the moiré pattern viewed by the camera. The fringe order N can be determined from the scalar product of the reference grating vector $$G = \frac{1}{g} e_x$$

and the position vector p, which yields:

$$N = G \cdot p = \frac{z}{g}(\tan\alpha + \tan\beta). \qquad \text{(Equation 1.2)}$$

Equation 1.2 provides the relationship between z and fringe order N as equation:

$$z(z, y) = \frac{g}{\tan\alpha + \tan\beta} N(x, y) \qquad \text{(Equation 1.3)}$$

where z and N apply to each x, y point in the field.

Equation 1.3 can provide constant sensitivity if tan $\alpha$+tan $\beta$ is constant. A shadow moiré example shown in FIG. 1 achieves constant sensitivity by placing the light source 15 and the camera 16 at the same distance L away from the plane of the reference grating. Thus, $$\tan\alpha + \tan\beta = \frac{D}{L+z} \approx \frac{D}{L} = \text{constant.} \quad \text{Equation (1.3)}$$

Therefore, the displacement is directly proportional to the moiré fringe order within the small displacement range.

Figure 2:
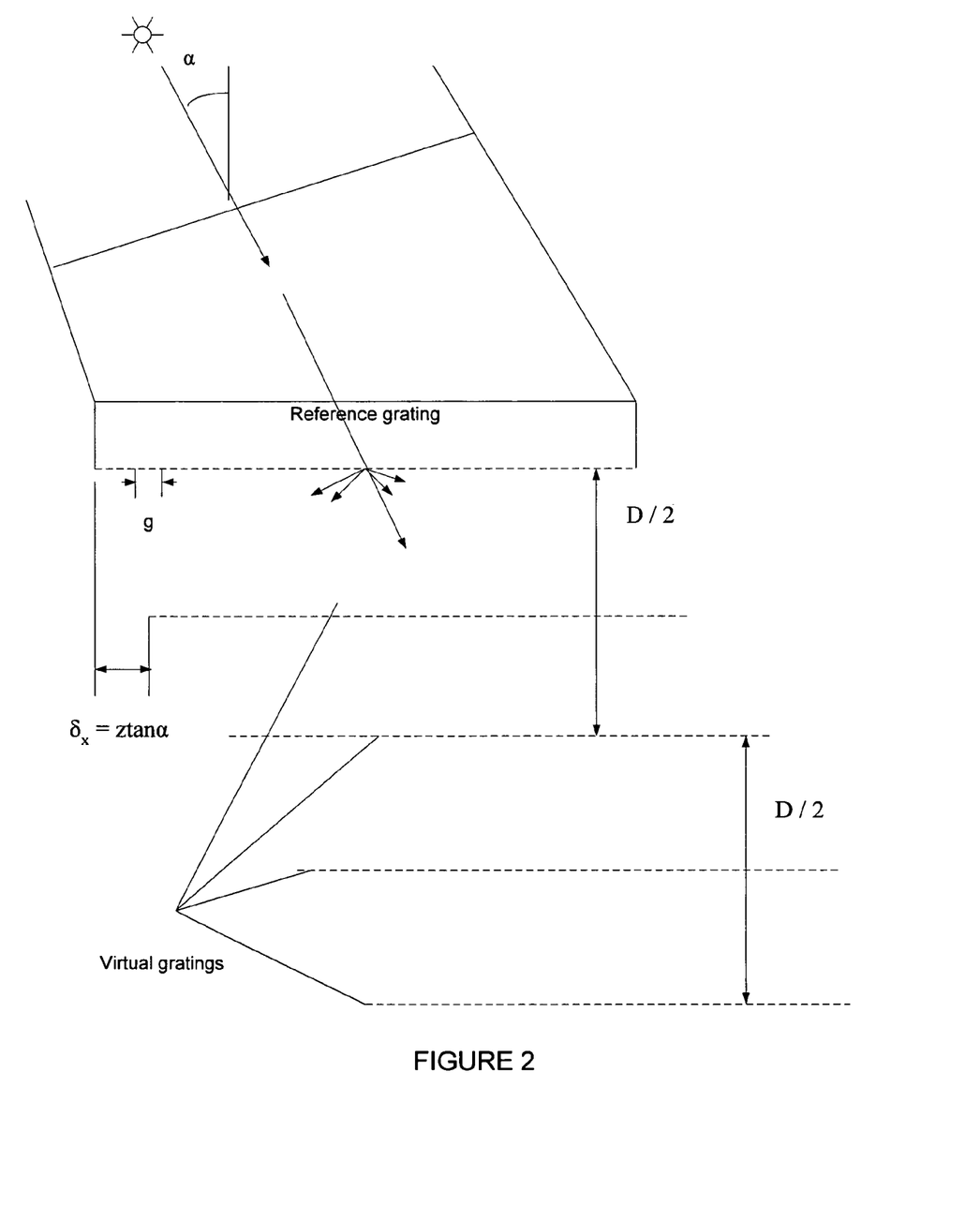
FIG. 2 illustrates virtual grating of optimal contrast formed at preferred distances.

The equation 1.3 implies that moiré fringes are formed for any value of z. In fact, the contrast of the moiré fringe pattern varies with z, such that the pattern disappears and reappears cyclically as z increases. This is caused by what is known as the Talbot effect, also referred to as the grating self-imaging effect. At a preferred distance between the reference grating and the object, and multiples of the preferred distance are known as the "Talbot distance", the interference of the diffracted beams produces alternating dark and bright bars that repeat at the same frequency as the grating. The virtual grating created is called a "Talbot image." Light diffracted in multiple orders by the real reference grating, recombines to form a series of virtual images of the grating in space. This is illustrated in FIG. 2.

The Talbot distance $$D_T^\alpha = \frac{2g^2}{\lambda}$$

when the grating of pitch g is illuminated at incident angle α by a monochromatic collimated beam of wavelength λ. The intensity distribution of the shadow grating at planes at the Talbot distance is a duplicate of the intensity distributions at planes that lie at distance other than the Talbot distance are not identical to those of the reference grating.

Shadow moiré techniques use oblique illumination instead of the normal illumination. The Talbot distance using shadow moiré is expressed as:

$$D_T^\alpha = \frac{2g^2}{\lambda}\cos^3\alpha,$$

when a grating g is illuminated at incident angle α, by a collimated beam having a central wavelength of λ as illustrated in FIG. 2. As in normal illumination, the intensity at multiples of Talbot distance is a duplicate of the intensity distribution of the reference grating but shifted by the amount $\delta_x = z \tan\alpha$ in the x-direction. The complimentary image of the grating appears at multiples of half the Talbot distance and the image of the gratings disappear at a quarter and three quarters of the Talbot distance.

Virtual grating images have optimum contrast at preferred planes which lie at successive distances $mD_T^\alpha/2$ (m=0, 1, 2, 3, ... ) from the reference grating. Virtual gratings of lower contrast are visible near these preferred planes. Thus, the gap between the grating and the specimen must lie near a preferred plane away from the reference grating. In an implementation of shadow moiré that utilizes coarse grating, the specimen is positioned within a small fraction of $D_T^\alpha/2$ from the reference grating. Within that region, the virtual gratings and the corresponding shadow moiré fringes have sufficient contrast.

However, when shadow moiré is utilized for the detection of deformation or warpage of microelectronic devices, higher sensitivity is required because of the smaller deformations that occur in the microelectronic devices. Sensitivity, as it relates to deformation, is a measure of a system's ability to detect small values of deformation.

For example, when shadow moiré is utilized in the microelectronics industry for coplanarity or warpage detection with reference gratings with a finer pitch such as for example, 25 μm to 200 μm, the Talbot distance $D_T^\alpha/2$ can become very small. For a shadow moiré system with a contour interval of 50 μm per fringe, desirable parameters for normal viewing (β=0) are g=0.1 mm, tan α=2 (or α=63.4°) and λ=661 nm, whereby $D_T^\alpha/2$ is only 2.7 mm. In such a case, it can be impractical or impossible to position the specimen within a small fraction of $D_T^\alpha/2$ from the reference grating, because the small value of the Talbot distance will not allow sufficient dynamic range within a small fraction of Talbot distance from the reference grating. The dynamic range is the maximum deformation that the shadow moiré system can measure with good contrast of fringe. This condition becomes even more problematic when shadow moiré techniques are used to document thermally or mechanically induced warpage because a gap between the reference grating and the specimen should be provided to accommodate the deformations.

In shadow moiré applications at zero or near zero Talbot distance, it is not possible to have enough dynamic range of fringe by positioning a specimen just in front of grating due to subtle and abrupt changes of fringe contrast, which results from the short or minimal Talbot distance. Therefore, especially in the field of deformation detection of microelectronic devices, the required high sensitivity can not be achieved without sacrificing the dynamic range of the system. Thus, there is a need in the art for a method and system utilizing shadow moiré for deformation detection that increases the dynamic range of a deformation measurement system, with enhanced sensitivity.

Accordingly, embodiments of the present invention are directed to a method and apparatus for measuring either thermally induced or mechanically induced deformation such as warpage, in the surface of a specimen. The following descriptions are exemplary embodiments of the present invention that describe the method and apparatus of the present invention to measure deformation of microelectronic devices including, but not limited to, printed wiring boards, or printed wiring assemblies. However, one skilled in the art would recognize that the present invention can be utilized to detect deformation of any desired test device, element or specimen of different shapes, sizes and configurations.

Figure 3:
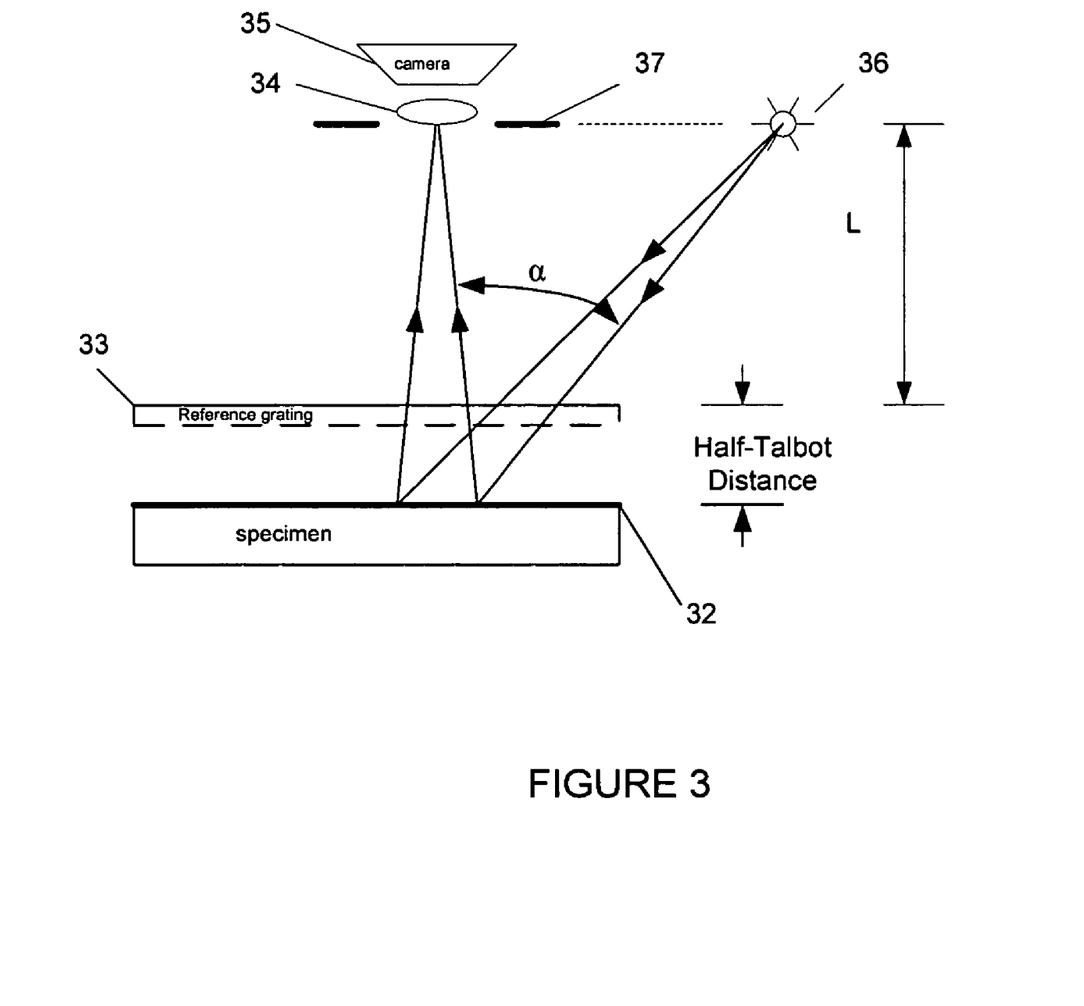
FIG. 3 illustrates an exemplary embodiment of the invention utilizing shadow moiré at non-zero Talbot distance.

FIG. 3 shows an exemplary illustration of shadow moiré at half the Talbot distance, in accordance with the present invention. The configuration enables shadow moiré to utilize the non-zero Talbot distance for positioning the specimen to measure deformation. As shown in FIG. 3 the specimen 32 is supported in a substantially stationary observation position. The system further includes a light source 36. According to this exemplary embodiment, the light source 36 is a white light source. The light source 36 is provided to illuminate the specimen 32 through a reference grating 33 of pitch g.

A camera 35 is provided to capture the fringe images, through the variable aperture 37 and imaging lens 34. The variable aperture is varied to adjust the contrast of the shadow moiré fringes and is discussed in greater detail below. The specimen 32 is adjusted to a non-zero Talbot distance 38 between the specimen 32 and the reference grating 33. The non-zero Talbot distance 38 is determined based upon the factors discussed above. According to other embodiments of the invention, the non-zero Talbot distance is $D_T^\alpha/2$ is multiplied by coefficient m.

Shadow moiré contrast and the use of the aperture is discussed below. In order to accurately express the exact intensity distribution I(x,z) of a Talbot image, the intensity distribution I of a Talbot image can be expressed as:

$$I(x, z) = E(x, z) \cdot \overline{E(x, z)} \quad \text{Equation 1.4}$$

$$\sum_n \sum_m a_n a_m \exp\left(i\frac{2\pi}{\lambda} x(\sin\theta_n - \sin\theta_m)\right)$$

$$\exp\left(i\frac{2\pi}{\lambda} z(\cos\theta_n - \cos\theta_m)\right)$$

$$\sum_n \sum_m a_n a_m \exp\left\{i\frac{2\pi}{g} x(n-m)\right\} \times$$

$$\left\{i\frac{2\pi}{\lambda} z\cos\alpha \sqrt{1 - 2\frac{n\lambda}{g}\frac{\sin\alpha}{\cos^2\alpha} - \left(\frac{n\lambda}{g}\right)^2 \frac{1}{\cos^2\alpha}} - \right.$$

$$\left. \sqrt{1 - 2\frac{m\lambda}{g}\frac{\sin\alpha}{\cos^2\alpha} - \left(\frac{m\lambda}{g}\right)^2 \frac{1}{\cos^2\alpha}} \right\}$$

The self-image described by equation 1.4 interacts with the reference grating to form shadow moiré fringes. Because of the diffraction term, the intensity distribution of shadow moiré does not produce the usual triangular distribution of geometric moiré fringes.

However, assuming an imaging system with a very small aperture, the intensity distribution of shadow moiré fringes $I_s$ can be determined by mathematically superimposing a Talbot image on a reference grating yielding:

$$I_s(z) = \frac{1}{g}\int_{-\frac{g}{2}}^{\frac{g}{2}} \{I(x, 0)I(x, z)\} dx \quad \text{Equation 1.5}$$

The maximum intensity and the minimum intensity of a shadow moiré fringe at a given distance z can be calculated numerically by altering Equation 2.9. Considering that the Talbot image translates by z tan α, the maximum intensity and minimum intensity at z can be expressed as $$I_s^{\max}(z) = \frac{1}{g}\int_{-\frac{g}{2}}^{\frac{g}{2}} \{I(x, 0)I(x + z\tan\alpha, z)\} dx \quad \text{Equations 1.6}$$

$$I_s^{\min}(z) = \frac{1}{g}\int_{-\frac{g}{2}}^{\frac{g}{2}} \left\{I(x, 0)I\left(x + z\tan\alpha + \frac{g}{2}, z\right)\right\} dx$$

The contrast due to Talbot effect $C_T$ which is referred to as Talbot contrast is defined as $$C_T(z) = \frac{I_s^{\max}(z) - I_s^{\min}(z)}{I_s^{\min}(z) + I_s^{\min}(z)} \quad \text{Equation 1.7}$$

The contrast attributed to the aperture effect $C_A$ or aperature contrast can be expressed as:

$$C_A(z) = \frac{I_A^{\max}(z) - I_A^{\min}(z)}{I_A^{\min}(z) + I_A^{\min}(z)} \quad \text{Eq. 1.8}$$

$$= 1 - \frac{8d_e z}{3\pi g}$$

$$= 1 - \frac{z}{D_w} \text{ for } 0 \le z \le \frac{3\pi g}{8d_e}$$

Combining the Talbot contrast and aperture contrast, the contrast of the shadow moiré fringes is defined as $$C(z) = C_T(z) \times C_A(z) \text{ for } 0 \le z \le \frac{3\pi g}{8d_e} \quad \text{Equation 1.9}$$

Figure 4:
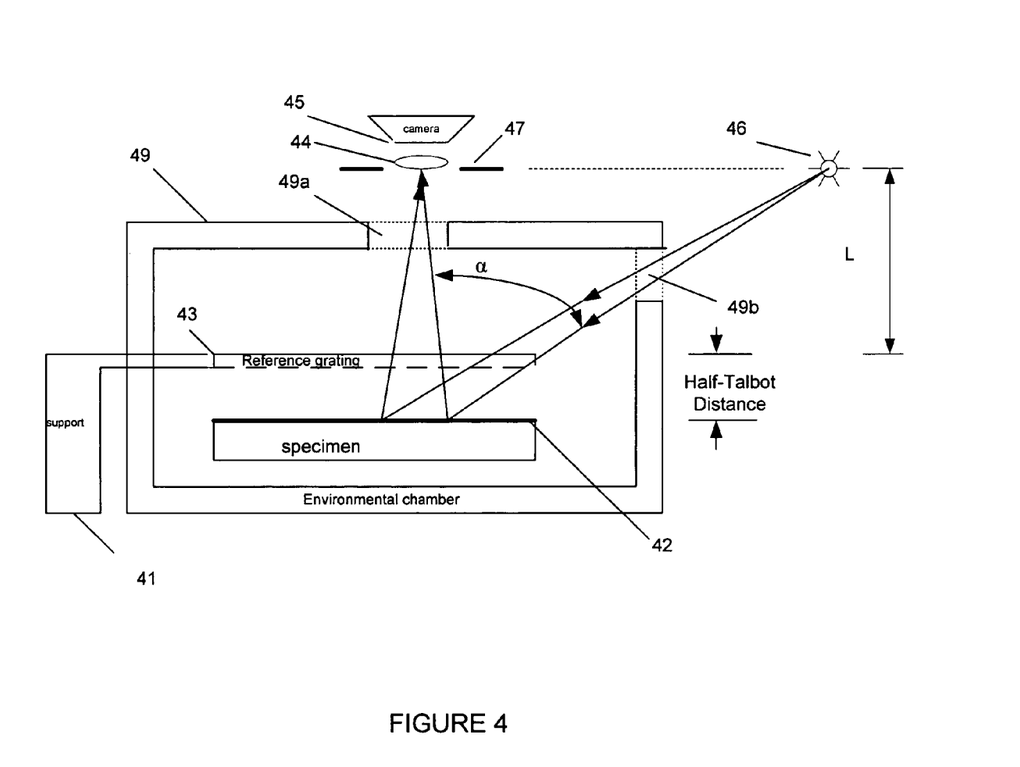
FIG. 4 illustrates an exemplary embodiment of the invention utilized to measure deformation of a specimen due to thermal loading.

FIG. 4 illustrates an exemplary embodiment of the invention utilized to measure deformation of a specimen due to thermal loading, utilizing an oven or environmental chamber 49. According to an exemplary embodiment, the environmental chamber includes a temperature controller to adjust the temperature within the environmental chamber 49. The temperature is controlled and monitored by the temperature controller. The environmental chamber 49 includes at least one transparent observation window 49a and a transparent illumination window 49b. The observation window 49a allows observation and/or image capture of the fringe images. The illumination window 49b allows the light source 46 to illuminate the specimen 42.

The specimen 42 is placed within the environmental chamber 49. The light source 46 illuminates the specimen 42. A specimen 42 is heated to at least one selected temperature over a period of time. The camera 45 captures images of the shadow moiré fringes over the given period time, with the images being captured at predetermined intervals of the time period. At the predetermined intervals, the warpage W of the specimen 42 is determined and compared with the W for the specimen at other time intervals. In other embodiments, the temperature may be selectively and/or incrementally increased over time and W for the specimen is determined at predetermined intervals of time and/or temperature.

Figure 5:
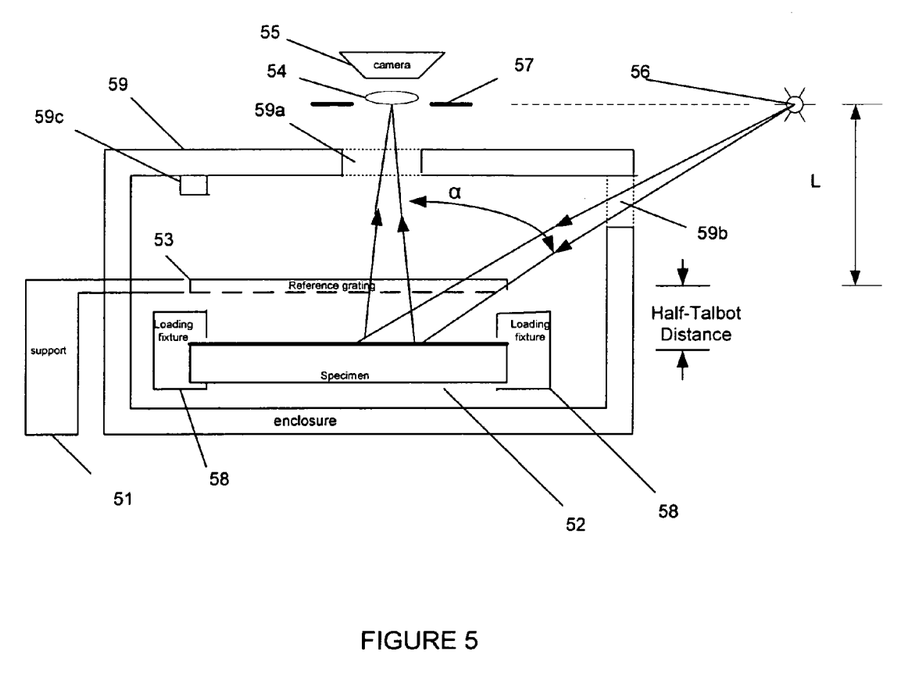
FIG. 5 illustrates another exemplary embodiment of the present invention utilized to measure deformation of a specimen due to mechanical loading.

FIG. 5 illustrates another exemplary embodiment of the present invention. According to this embodiment, the deformation measurement system is used to measure deformation of a specimen due to mechanical loading. According to this embodiment, a loading fixture 58 is added to the system illustrated in FIG. 3. The loading fixture 58 applies and varies a load upon the specimen 52. The load is controlled and monitored by a controller.

To measure the deformation of the specimen due to mechanical loading the light source 56 illuminates the specimen 52. A load is applied by the loading fixture 58 to the specimen 52 at at least one selected load over a period of time. The camera 55 captures images of the shadow moiré fringes over the given period time, with the images being captured at predetermined intervals of the time period. At the predetermined intervals, the warpage W of the specimen 52 is determined and compared with the W for the specimen at other time intervals. In other embodiments, the temperature may be selectively and/or incrementally increased over time and W for the specimen is determined at predetermined intervals of time and/or temperature. The temperature is controlled by a controller 59c.

Figure 6:
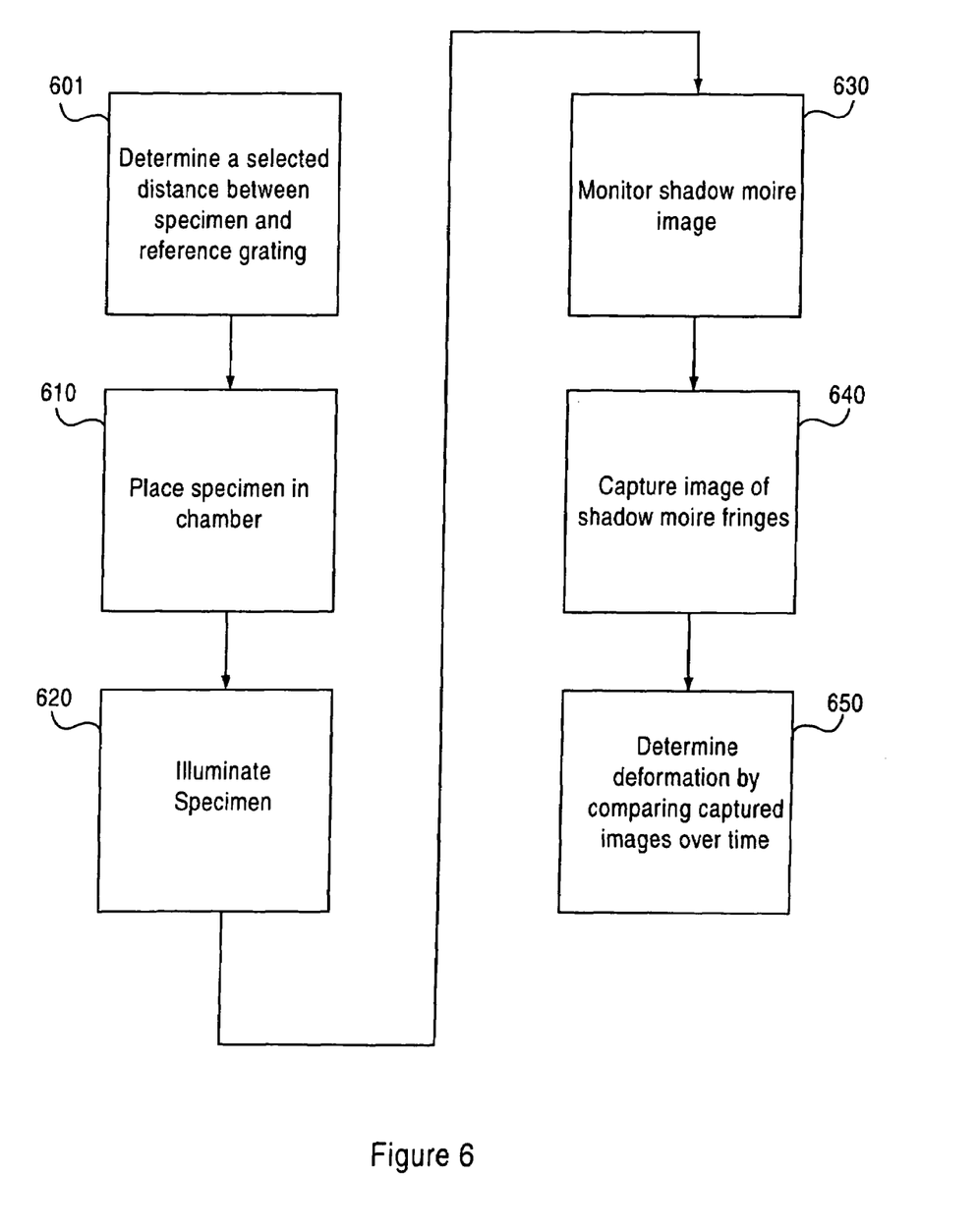
FIG. 6 is a flow diagram of an exemplary embodiment of the present invention.

FIG. 6 illustrates an exemplary embodiment of the present invention. In step 601 the selected difference between the specimen and reference grating is determined. In step 610, the specimen is place in a chamber, such as for example a temperature chamber that includes a temperature controller to control the temperature of the specimen. In step 620 the specimen is illuminated by a light source. In step 630, the shadow moiré image is monitored over time and the shadow moiré image is captured, step 640. The monitoring can be accomplished by means and apparatus that are well-known in the art. According to an alternate embodiment, the shadow moiré image is monitored and captured over predetermined time intervals. In step 650, the deformation of the specimen is determined by comparing the captured shadow moiré images.

According to another embodiment of the invention, deformation of a specimen due to both thermal and mechanical loading is measured by placing the loading fixture containing the specimen in an environmental chamber.

One having ordinary skill in the art will readily understand that the invention as discussed above may be practiced with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. For example, various means well-known in the art may be provided to remotely control and record temperature, and mechanical loading and Talbot distance, as well as, to vary the aperture. Further, specimens not only include but are not limited to, PWB, PCB but also include specimens of varying shapes and sizes that are known in the art. In order to determine the metes and bounds of the invention, therefore, reference should be made to the appended claims.

We claim:

1. A method for measuring deformation in specimens, the method comprising:

determining a selected distance between a specimen and a reference grating, wherein the selected distance is determined by $mD_T^\alpha/2$, wherein $$D_T^\alpha = \frac{2g^2}{\lambda}\cos^3\alpha,$$

wherein g is a pitch of the reference grating that is illuminated at incident angle $\alpha$, by a collimated beam of light having a central wavelength of $\lambda$, and m is a whole number coefficient thereof;

illuminating the specimen with light from an illumination source directed through the reference grating onto the specimen, thereby forming shadow moiré fringes onto the specimen; and observing an image of the shadow moiré fringes.

2. The method of claim 1, further comprising:

placing the specimen in an environmental chamber for enclosing the specimen and selectively controlling a temperature of the specimen, wherein temperature inside of the environmental chamber is controlled and monitored;

heating the specimen such as to cause the temperature of the specimen to follow a temperature profile over a period of time;

capturing images of the shadow moiré fringes with the image capture device and recording the temperature of the specimen; and determining deformation of the specimen by comparing the captured images of the shadow moiré fringes.

3. The method of claim 2, wherein the step of capturing the images of the shadow moiré fringes includes capturing the images at at least one predetermined time interval of the period of time.

4. The method of claim 2, wherein the step of determining the deformation of the specimen is accomplished by $W=Ng/(\tan\alpha+\tan\beta)$, wherein W is the out of plane deformation, N is the fringe order, g is the grating pitch, $\alpha$ is the angle of light incidence, and $\beta$ is the camera angle.

5. The method of claim 2, wherein the specimen is a microelectronic device.

6. The method of claim 1, further comprising:

placing the specimen onto a loading fixture in order to selectively control a mechanical load onto the specimen;

increasing and monitoring the mechanical load placed onto the specimen over a period of time;

capturing the images of the shadow moiré fringes with the image capture device; and determining deformation of the specimen by comparing the captured images of the shadow moiré fringes.

7. The method of claim 6, wherein the step of capturing the images of the shadow moiré fringes includes capturing the images at at least one predetermined time interval of the period of time.

8. The method of claim 6 wherein the step of determining the deformation of the specimen is accomplished by $W=Ng/(\tan\alpha+\tan\beta)$, wherein W is the out of plane deformation, N is the fringe order, g is the grating pitch, $\alpha$ is the angle of light incidence, and $\beta$ is the camera angle.

9. The method of claim 6, wherein the specimen is a microelectronic device.

10. The method of claim 1, wherein providing a shadow moiré system further includes providing a variable aperture and imaging lens; and capturing the image of the shadow moiré fringes further includes varying the aperture to provide enhanced contrast of the shadow moiré fringes.

11. A system for measuring deformation in specimens, the system comprising:

a support for supporting a specimen in an observation position;

a grating of pitch g supported in a stationary position by a support;

a light source for illuminating the specimen through the grating such that shadow moiré fringes are formed on the specimen;

an image capturing device for capturing images of the shadow moiré fringes, wherein the grating is placed a selected distance from the specimen by the support, and the selected distance is determined by $mD_T^\alpha/2$, wherein $$D_T^\alpha = \frac{2g^2}{\lambda}\cos^3\alpha,$$

wherein g is a pitch of the reference grating that is illuminated at incident angle $\alpha$, by a collimated beam of light having a central wavelength of $\lambda$, and wherein m is a whole number multiple thereof.

12. The system of claim 11, further comprising:
an environmental chamber, wherein the environmental chamber includes a temperature controller for selectively controlling a temperature of the specimen, and wherein temperature inside of the environmental chamber is controlled and monitored;
means for heating the specimen such as to cause the temperature of the specimen to follow a temperature profile over a period of time;
wherein the image capture device captures images of the shadow moiré fringes, and
wherein deformation of the specimen is determined by comparing the captured images of the shadow moiré fringes.

13. The system of claim 12, wherein the image capture device captures the images of the shadow moiré fringes at at least one predetermined time interval of the period of time.

14. The system of claim 12, wherein the image capture device captures the images at at least one predetermined time interval of the period of time.

15. The system of claim 12, wherein determining the deformation of the specimen is accomplished according to W=Ng/(tan α+tan β), wherein W is the out of plane deformation, N is the fringe order, g is the grating pitch, α is the angle of light incidence, and β is the camera angle.

16. The system of claim 12, wherein the specimen is a microelectronic device.

17. The system of claim 11, further comprising:
a controller for selectively controlling a mechanical load onto the specimen;
a monitor for monitoring the mechanical load placed onto the specimen over a period of time;
wherein the image capture device captures the images of the shadow moiré fringes, and
wherein deformation of the specimen is determined by comparing the captured images of the shadow moiré fringes.

18. The system of claim 17, wherein determining the deformation of the specimen is accomplished according to W=Ng/(tan α+tan β), wherein W is the out of plane deformation, N is the fringe order, g is the grating pitch, α is the angle of light incidence, and β is the camera angle.

19. The system of claim 17, wherein the specimen is a microelectronic device.

20. The system of claim 11, wherein the system further includes a variable aperture and imaging lens, wherein the aperture is varied to provide enhanced contrast of the shadow moiré fringes.

21. An apparatus for measuring deformation in specimens, the apparatus comprising:
a support means for supporting a specimen in an observation position;
a grating of pitch g supported in a stationary position by a support means;
an illumination means for illuminating the specimen through the grating such that shadow moiré fringes are formed on the specimen;
an image capturing means for capturing images of the shadow moiré fringes, wherein the grating is placed a selected distance from the specimen by the support means, and the selected distance is determined by $mD_T^\alpha/2$, wherein $$D_T^\alpha = \frac{2g^2}{\lambda}\cos^3\alpha,$$

wherein g is a pitch of the reference grating that is illuminated at incident angle α, by a collimated beam of light having a central wavelength of λ, and wherein m is a whole number coefficient thereof.

* * * * *